L. DAUTREPPE.
PROCESS FOR IMPREGNATING WOOD.
APPLICATION FILED MAR. 15, 1913.
1,076,553.
Patented Oct. 21, 1913.
2 SHEETS—SHEET 1.
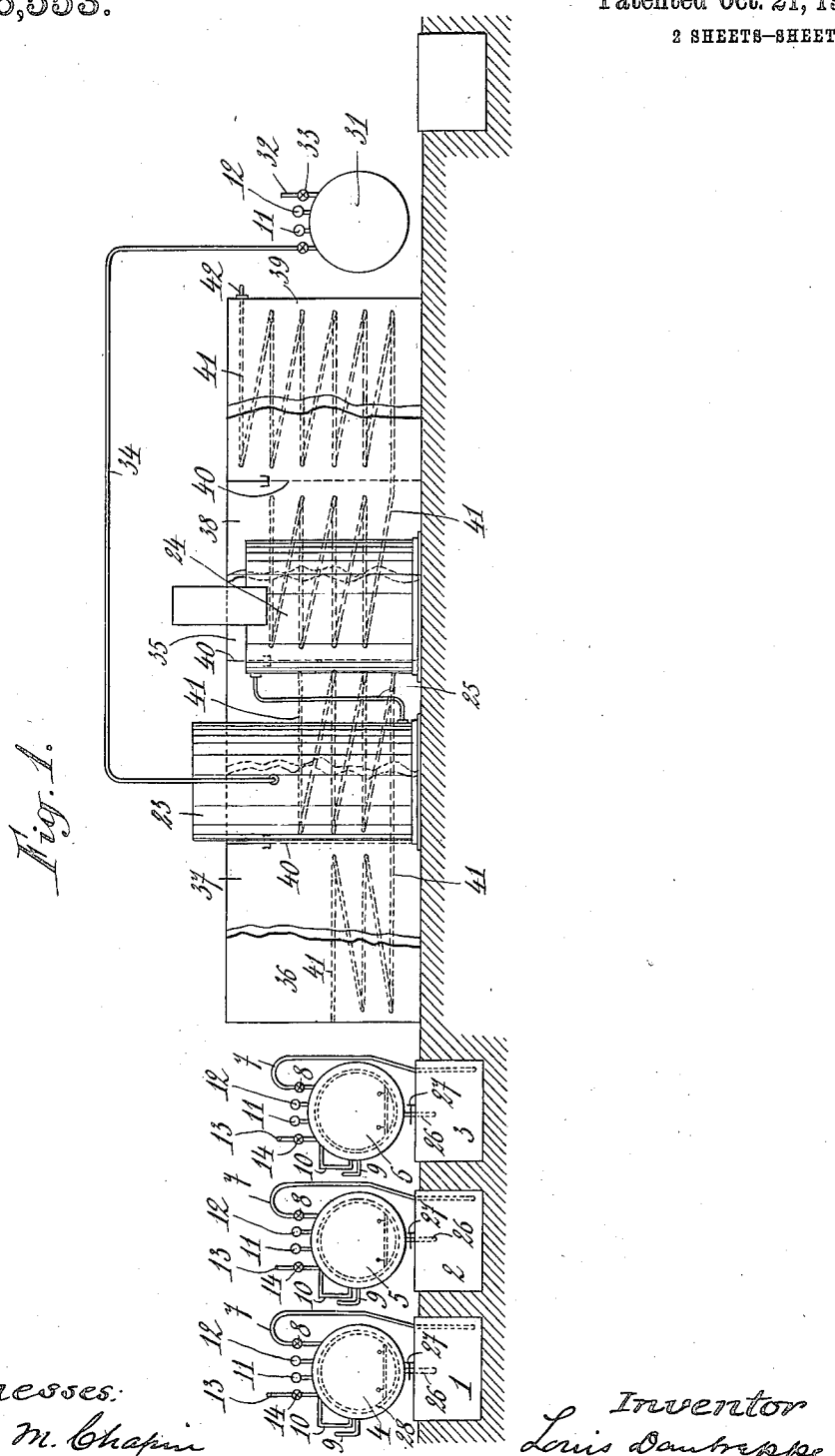

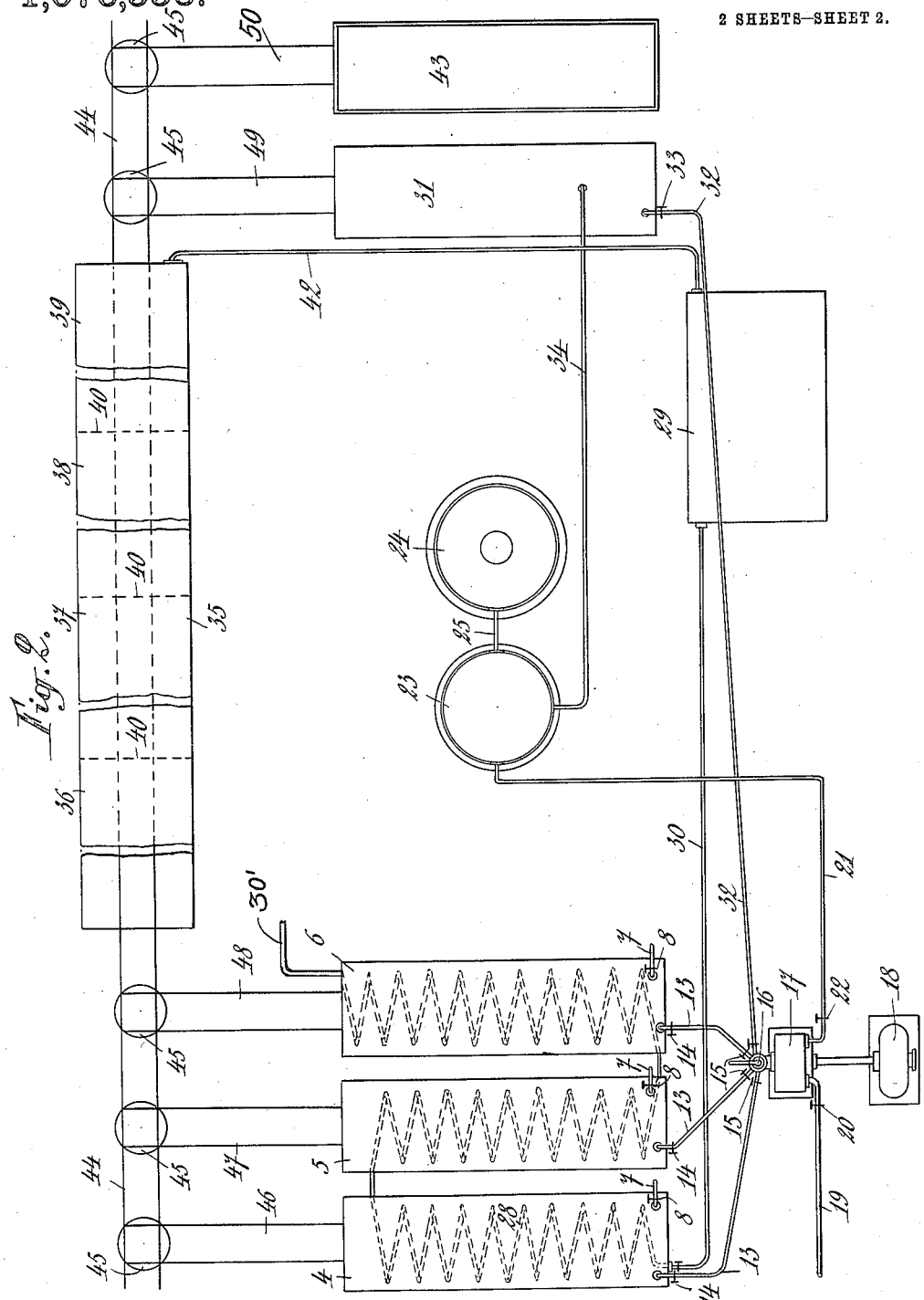

UNITED STATES PATENT OFFICE.

LOUIS DAUTREPPE, OF BRUSSELS, BELGIUM.

PROCESS FOR IMPREGNATING WOOD.

1,076,553.

Specification of Letters Patent.　　Patented Oct. 21, 1913.

Application filed March 15, 1913. Serial No. 754,482.

*To all whom it may concern:*

Be it known that I, LOUIS DAUTREPPE, a subject of the King of Belgium, residing at Brussels, in the Kingdom of Belgium, have invented certain new and useful Improvements in Processes for Impregnating Wood, of which the following is a specification.

This invention relates to a process for impregnating wood by means of solutions of silicate of potash or of soda for the purpose of rendering it incombustible, imputrescible, non-hygroscopic and proof against the attacks of insects.

The process is based upon the impregnation of wood by means of successive solutions of silicate of potash or of soda of different degrees of concentration and it has for its object the formation around the ligneous fibers of the treated wood of an insoluble deposit which is incombustible and capable of giving off a gas unsuitable for supporting combustion.

According to the invention the wood to be treated is first submitted to the action of a relatively high temperature operating under a vacuum in a manner to expel the air or gases occluded in the pores of the wood and to bring about the evacuation in the form of vapor of the water which is contained therein. The wood is then treated successively in autoclaves with solutions of silicate of potash or of soda of progressive degrees of concentration, without intermediate drying and with the intervention of a suitable pressure at a moderate temperature. The impregnation properly so called, being effected, the wood is dried progressively at a temperature which may reach 100° C. and is then treated with carbonic anhydrid or carbon dioxid under pressure so as to bring about the decomposition of the silicate of potash or of soda and its transformation into bicarbonate of potash or of soda with liberation of silica. After a final washing to remove the bicarbonate in excess, the wood is dried in the air, or preferably under the action of hot air at a temperature below 40° C. The wood thus treated may be at once utilized, or, it may be covered with a suitable impermeable and insulating coating according to the purpose for which it is intended.

To enable the invention to be fully understood I will describe the same by reference to the accompanying drawing which shows diagrammatically a suitable installation for carrying out the process.

Figure 1 is a diagrammatical elevation of the entire installation. Fig. 2 is a plan of Fig. 1.

1, 2 and 3 indicate three tanks containing solutions of silicate of potash or of soda of different degrees of concentration. The tank 1, for example, contains a solution at 15° Bé., the tank 2 a solution at 30–35° Bé. and the tank 3 a solution of a concentration of 40–45° Bé. Each tank is surmounted by an autoclave 4, 5, 6 of dimensions corresponding with, and of a capacity nearly equivalent to, that of the tanks 1, 2 and 3. Each autoclave is provided with a pipe 7 which dips into the corresponding tank and is provided with a valve 8. Each autoclave is also provided with a thermometer 9, a level indicator 10, a pressure gage 11, a vacuum gage 12 and a pipe 13 with a valve 14. The pipes 13 are connected by branches provided with valves 15 to a junction box 16 connected to a suction and force pump 17 actuated by a motor 18. This pump is provided with an air suction pipe 19 having a valve 20 and a pipe 21, having a valve 22, connected to a gasholder 23 containing carbonic anhydrid produced in a suitable generator 24 connected to the gasholder by a pipe 25.

Each autoclave is provided at its lower part with a discharge pipe 26 having a valve 27 to allow the contents of the autoclave to be run off into the corresponding tank. In each autoclave is a heating coil 28 and these coils may be connected in series to each other, as shown in the drawing, or, each may be separately connected to a steam supply pipe. In the example shown, steam is supplied by a generator 29 connected by a pipe 30 to the coil 28 of the autoclave 4; the steam having served for successively heating the three tanks, finally passes through a pipe 30' either to a condenser, or to any other suitable apparatus for utilizing the same. The installation further comprises an autoclave 31, similar to the autoclaves 4, 5 and 6, connected by a pipe 32 having a valve 33 to the junction box 16 of the pump 17; this autoclave is further connected by a pipe 34 to the gasholder 23. In a suitable position, preferably, between the autoclaves 6 and 31, is placed a drying stove 35 divided into a certain number of compartments, for example, four compartments, 36, 37, 38 and 39 separated by movable partitions 40. The different compartments of this drying stove contain heating coils 41 fed by the boiler 29 by means of a pipe 42. These coils are arranged in the compartments of the drying stove in such a manner that there will be a temperature of 30° C. in the compartment 36, a temperature of 60° C. in the compartment 37, a temperature of 80° C. in the compartment 38, and a temperature of 100° C. in the compartment 39. At the side of the autoclave 31 is a tank 43 similar to the tanks 1, 2 and 3 but designed for washing the treated wood. In order to easily make use of the installation the latter may be completed by a railway 44 provided with turn-tables 45 and branches 46, 47, 48, 49 and 50 corresponding to the autoclaves 4, 5, 6 and 31 and to the washing tank 43.

The operation of the apparatus is carried out in the following manner: The wood to be treated is brought by means of a wagon to the branch 46 in front of the autoclave 4 into which it is introduced. The autoclave being closed and free of liquid, the temperature is raised to about 60° C. by means of the coil 28 supplied by the boiler 29. Simultaneously the valve 14 of the pipe 13 corresponding to this autoclave is opened and the pump 17 is started to create a vacuum in the autoclave. Under the action of heat and vacuum the air and the gases contained in the vessels and the cells of the wood are expelled and drawn out. Simultaneously the water contained in the wood (about 15 to 20 per cent.) escapes in the form of steam which is likewise drawn through the pipe 13. After having thus subjected the wood, during a period of time which is variable, for example, for from 1 to 3 hours, to the action of vacuum and heat, the valve 8 of the pipe 7 is opened which allows the solution of silicate of potash, or of soda, of 15° Bé. contained in the tank 1 to enter the autoclave. The solution completely covering the wood contained in the autoclave, the valve 8 is closed and suitable pressure is exerted on the surface of the liquid by means of the pump 17 through the pipe 13, the pressure being variable, according to the kind of wood to be treated and its dimensions, and pressure is maintained in the autoclave during the time necessary to obtain an impregnation which extends to the heart of the wood. The cock 27 is then opened, and the solution which has served for the treatment is allowed to run off into the tank 1. The wood is then withdrawn from the autoclave and is brought immediately by the way 46, the turn-tables 45, and the ways 44 and 47 into the autoclave 5 into which is also introduced by suction the solution of silicate of potash or of soda, at a density of 30 to 35° Bé., contained in the tank 2. The autoclave is then put under pressure by means of the pump 17 forcing air into the pipe 13 and the pressure (8 to 12 kilogs., for example) is maintained for about 24 hours, or more according to the kind of the wood treated and its dimensions, the autoclave being heated to a temperature of about 30° C. The denser solution employed in the autoclave 5 possessing an osmotic pressure stronger than the solution with which the wood is impregnated and which fills the cells of the wood, there is produced between the two solutions an equilibrium of the osmotic pressure which increases the density of the solution filling the cells and consequently strengthens the impregnation. The wood is then treated in the third autoclave 6 by means of the solution 40° to 45° Bé. After treatment in this autoclave under a pressure of 8 to 12 kilogs. or more for about 24 hours or more, and at a temperature of about 30° C., the wood is withdrawn from the autoclave and passed into the drying stove 35 for a variable time according to the kind of wood being treated and its dimensions; the wood is thus treated successively in different compartments of the drying stove at temperatures reaching to 100° C. On being withdrawn from the drying chamber the wood is conducted by means of the way 49 into the autoclave 31 into which is forced by the pump 17 carbonic anhydrid drawn from the gas-holder 23 through the pipe 21 and forced into the autoclave through the pipe 32, after having operated a vacuum. There is thus established a pressure of about 5 kilogs. in the autoclave 31 and the action of the gas under pressure is prolonged for about 24 hours. Under the action of the carbonic anhydrid the silicate decomposes liberating silica and forming bicarbonate of potash or of soda. The silica completely incloses the ligneous fibers and renders the wood completely non-inflammable, imputrescible and anti-hygroscopic. The treatment in the autoclave 31 being terminated, the carbonic acid in excess is returned to the gasholder 23 through the pipe 34 on expanding, after which the wood is withdrawn from the autoclave and conveyed by means of the way 50 to the washing tank 43 in order to remove the excess of bicarbonate. On its removal from the tank 43, the wood is dried in the air, or in a current of hot air the temperature of which should not exceed 40° C. The wood is then ready for use. If it is to be used for special purposes, as for example, casings for electrical conductors, or as insulating material it is coated by preference with a composition consisting of silicate of iron and of manganese mixed in a solution of silicate of potash or soda at 35° Bé. and is then heated to a temperature of 50° to 100° C. This coating increases the qualities of impermeability and insulation. If the wood should be placed in the interior of walls where it would be liable to come in contact with mortar it is coated with a coating composed of tar or pitch in solution in any suitable solvent.

Wood treated by the process above described offers a resistance which is particularly great to the action of fire owing to the fibers being surrounded with a material practically infusible, and that, further, under the action of fire there is produced a disengagement of carbonic acid arising from the decomposition of the bicarbonate of soda or of potash under the action of heat, which carbonic acid remains in the wood after the washing away of the excess of the same in the washing tank 43, and the liberation of the carbonic acid occluded in the wood. The process presents, further, the advantage of obtaining in some cases as a by-product a non-combustible paint possessing particular qualities. In fact, when resinous wood is treated the first impregnation in the autoclave 4 has the effect of charging the silicate solution with the resins contained in the wood. This solution of silicate of potash or of soda saturated with the resins from the wood constitutes a fire resisting paint which does not crack or scale or peel off and is not efflorescent.

It is to be understood that I do not limit my invention to the details of the process or to the means described for carrying it out as they may be varied according to the nature of the wood to be treated and the conditions of work it is desired to realize.

What I claim is:

1. In a process for impregnating wood, subjecting the wood successively to the action of solutions of silicate of an alkali metal having progressive degrees of concentration.

2. In a process for impregnating wood, subjecting the wood to the action of a first solution of silicate of an alkali metal, then immediately afterward to the action of a solution of silicate of an alkali metal of greater concentration and then immediately afterward to the action of a third solution of silicate of an alkali metal of a still greater concentration.

3. In a process for impregnating wood, subjecting the wood successively to the action of solutions of silicate of an alkali metal having progressive degrees of concentration, then drying said wood and subjecting said wood to the action of carbonic anhydrid.

4. In a process for impregnating wood, subjecting the wood in a vacuum to the action of heat, then impregnating said wood successively by means of solutions of an alkali metal of progressive concentrations, then drying said wood and finally treating said wood with carbonic anhydrid under pressure.

5. In a process for impregnating wood, subjecting the wood in a vacuum to the action of heat, then impregnating said wood by means of the first solution of silicate of an alkali metal, subjecting said wood to the action of a pressure while it is plunged in said impregnating solution, then plunging said wood immediately afterward into a second solution of silicate of an alkali metal of a greater concentration and under pressure, then plunging said wood immediately afterward into a third solution of silicate of an alkali metal of a still greater concentration and under pressure, then drying said wood at progressive temperatures and finally treating said wood with carbonic anhydrid under pressure.

6. In a process for impregnating wood, subjecting the wood in a vacuum to the action of heat, then subjecting said wood successively to the action of a plurality of solutions of silicate of an alkali metal of progressive concentrations, subjecting the wood to the action of pressure and heat while it is plunged in said solutions, then drying said wood at progressive temperatures comprised between 30° and 100° C. and finally treating said wood with carbonic anhydrid under pressure.

7. In a process for impregnating wood, subjecting the wood in a vacuum to the action of heat, then subjecting said wood successively to the action of a plurality of solutions of silicate of an alkali metal of progressive concentrations, subjecting the wood to the action of pressure and heat while it is plunged in said solutions, then drying said wood at progressive temperatures, then treating with carbonic anhydrid under pressure, then washing said wood and finally drying at a temperature below 40° C.

8. In a process for impregnating wood, subjecting the wood in a vacuum to the action of heat, impregnating said wood successively with solutions of an alkali metal possessing different degrees of concentration, these different impregnations being effected immediately one after the other, under pressure and heat, then drying said wood at progressive temperatures comprised between 30 to 100° C., then subjecting said wood to the action of carbonic anhydrid under pressure, whereby the silicate is decomposed with a formation of bicarbonate of an alkali metal and liberation of silica, then washing said wood and finally drying at a temperature below 40° C.

9. In a process for impregnating wood, subjecting the wood in a vacuum to the action of a temperature of about 60° C., then impregnating said wood under pressure by means of a solution of silicate of an alkali metal of 15° Bé., then plunging said wood immediately afterward into a solution of from 30° to 35° B., submitting the wood in said solution to the action of pressure and of a temperature of about 30° C., then plunging the wood into a solution of 40° B. to 45° Bé., submitting said wood in said solution to the action of pressure and of a temperature of 30° C., then drying at progressive temperatures comprised between 30 to 100° C., then treating with carbonic anhydrid under pressure, washing and finally drying at a temperature below 40° C.

In testimony whereof I have affixed my signature in presence of two witnesses.

LOUIS DAUTREPPE.

Witnesses:
JACQUE BEDE,
CHAS. ROY NASMITH.